United States Patent Office 3,429,559
Patented Feb. 25, 1969

3,429,559
TUMBLING APPARATUS
Dieter Dreher, Pforzheim, and Manfrid Dreher, Engelsbrand, near Pforzheim, Germany, assignors to Dr. Ing. Manfrid Dreher KG., Engelsbrand, near Pforzheim, Germany
Filed Oct. 30, 1967, Ser. No. 678,855
Claims priority, application Germany, Oct. 28, 1966, D 51,425
U.S. Cl. 259—3        11 Claims
Int. Cl. B01f 15/00, 9/02; B08b 3/06

ABSTRACT OF THE DISCLOSURE

A tumbling apparatus with a plurality of tumbling barrels arranged end-to-end on spaced substantially parallel elongated drive rollers to be rotated thereby about the barrel axes, and transporting means arranged above the barrels for lifting the same from the drive rollers and for transporting the barrels substantially in direction of elongation of the latter to a filling and discharge station arranged at one end of a frame which rotatably carries the rollers.

Background of the invention

The present invention relates to a tumbling apparatus, especially for polishing and cleaning of articles, in which a par of elongated rollers arranged spaced and parallel from each other are mounted in a frame turnable about their axes and on which a plurality of tumbling barrels, each closable by a door, are supported for rotation about their axes, for which purpose a pair of circular discs, coaxial with the axis of the respective barrel, are fixed to opposite ends of the latter, which discs rest with their peripheral surfaces on the rollers, and in which the apparatus includes transporting means for removing the individual barrels from the frame and for transporting the barrels along the frame to a filling and discharging station. Tumbling apparatus of the aforementioned kind is known in which the transporting means are arranged at the front side of the frame. The transporting means of the known tumbling apparatus includes a carriage which is movable along the frame and which is arrestable in front of a respective barrel on the frame. The carriage is provided with means to support the barrel placed thereon and with a container in which the tumbled material may be discharged from the barrel.

The arrangement of the transporting apparatus on the front side of the frame in which the barrels are turnably arranged evidently increases the width of the apparatus considerably, whereby in front of the transporting means additional space has to be provided for the operator. Furthermore, with the known apparatus it is necessary to remove the tumbling barrels manually from the drive rollers, respectively the machine frame, in order to place the barrels on the carriage of the transporting means, which is evidently only possible when the filled barrels are relatively light. Therefore only barrels of small volume can be used in such an apparatus.

It is an object of the present invention to overcome the aforementioned disadvantages of tumbling apparatus known in the art.

It is an additional object of the present invention to provide for a tumbling apparatus in which the space requirements for the apparatus are reduced in comparison with known apparatus of this type.

It is a further object of the present invention to provide a tumbling apparatus of the aforementioned type in which barrels of a relatively large capacity can be used and in which these barrels may be moved individually in a very efficient manner from their respective place on the drive rollers to a filling and discharging station and back again to the drive rollers.

Summary of the invention

With these objects in view, the tumbling apparatus of the present invention, especially for cleaning and polishing of articles, mainly comprises an elongated supporting frame, a pair of elongated drive rollers mounted in the frame rotatable about spaced substantially parallel and substantially horizontally arranged axes, drive means connected to at least one of the drive rollers for rotating the same about its axis, at least two tumbling barrels having each at opposite ends thereof circular discs and a closable door for filling and emptying the barrel. The barrels being arranged coaxial and adjacent each other, with the circular discs resting on the rollers, and a filling and discharging station is provided at one end of the frame. The apparatus includes further transporting means arranged above the frame and including substantially horizontal guide means extending in longitudinal direction of the frame beyond said one end thereof, and lifting means movable along the guide means and adapted to cooperate with each of the tumbling barrels for lifting the same from the roller and for transporting the same to the filling and discharge station and back again onto the rollers.

Since in the tumbling apparatus according to the present invention the transporting means are arranged above the supporting frame of the apparatus, the width of the apparatus may be considerably reduced as compared with tumbling apparatus known in the art and by providing mechanical lifting means by means of which the barrels may be lifted from the transporting rollers it is possible to use barrels with greater capacity. Furthermore, no additional floor space is required for transporting the barels between their positions on the drive rollers and the filling and discharging station.

The lifting means and the means for connecting the barrels to the lifting means in order to lift the individual barrels from the supporting frame, respectively to place the barrel onto the driving rollers in the supporting frame, may be constructed in various different ways. In a preferred construction the lifting means include an electricially operated hoisting trolley which is movable along a guide rail arranged in a horizontal plane above the supporting frame. An especially advantageous arrangement is derived when each of the barrels is provided with a pair of trunnions respectively projecting outwardly from the end discs coaxially therewith and in which for each of the barrels a carrying frame is provided which has a pair of seating means adapted to seat the trunnions during lifting of the carrying frame by the lifting means. The elongated supporting frame may have a plurality of spaced members extending transverse to the elongation thereof between which the tumbling barrels are respectively located and the carrying frame may include a pair of upright arms connected by a strap at one of the ends thereof to each other and be provided with abutment means on the arms adapted to be seated on the transverse members of the supporting frame during lowering of the carrying frame. In this arrangement the abutment means and the seating means are preferably arranged in vertical direction with respect to the axes of the trunnions and the axes of the drive rollers in such a manner that during seating of the abutment means on the transverse members of the supporting frame, the discs of the respective barrels will rest on the rollers, while the seating means will be disengaged from the trunnions.

The abutment means may comprise a pair of substantially horizontal transverse arms respectively projecting to opposite sides of each of the upright arms of the carrying frame and respectively extending spaced from said substantially parallel to the discs of the respective barrel and each carrying at the region of its free end a downwardly extending elastically yieldable buffer. In such an arrangement the carrying frames are as maintained in proper position so that the carrying frames have to be only attached to the lifting device in order to lift the respective barrel from the supporting frame. Each barrel thus supported in its own frame will arrive at the filling and discharging station properly supported and has not to be transferred at the station to different supporting means.

A further advantageous feature according to the present invention may reside in the provision of upwardly projecting guide means on the transverse members of the carrying frame and provided with guide faces approaching each other in downward direction for orienting each barrel during lowering thereof to its proper position on the driving rollers. Each of the aforementioned guide means may have a pair of guide faces approaching each other in upward direction so that the guide faces on each guide means may cooperate with ends of adjacent barrels.

The novel features which are considered as characteristic for the invention are set forth in particular in the appended claims. The invention itself, however, both as to its construction and its method operation, together with additional objects and advantages thereof, will be best understood from the following description of specific embodiments when read in connection with the accompanying drawing.

Description of the preferred embodiments

Figure 1:
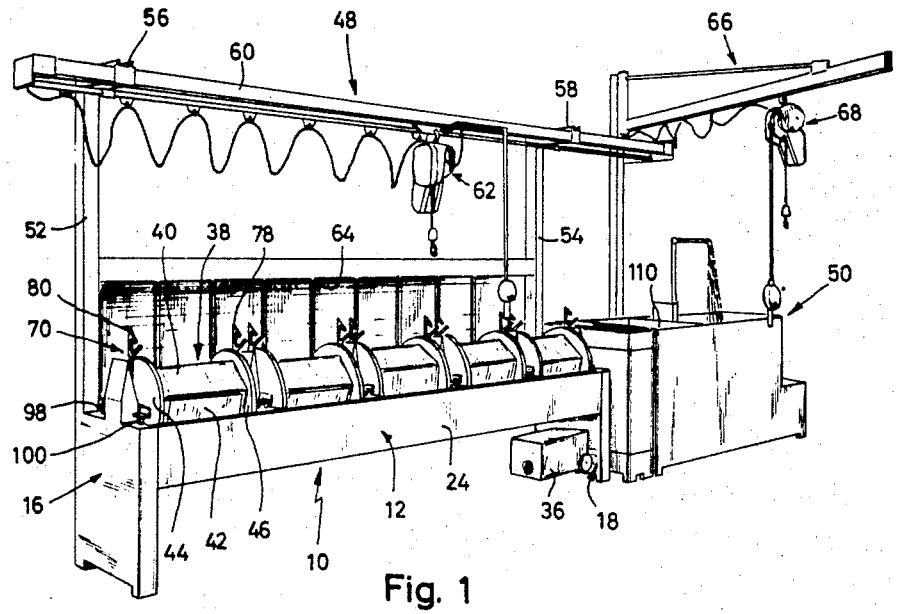
FIG. 1 is a perspective overall view of the tumbling apparatus according to the present invention.
Figure 2:
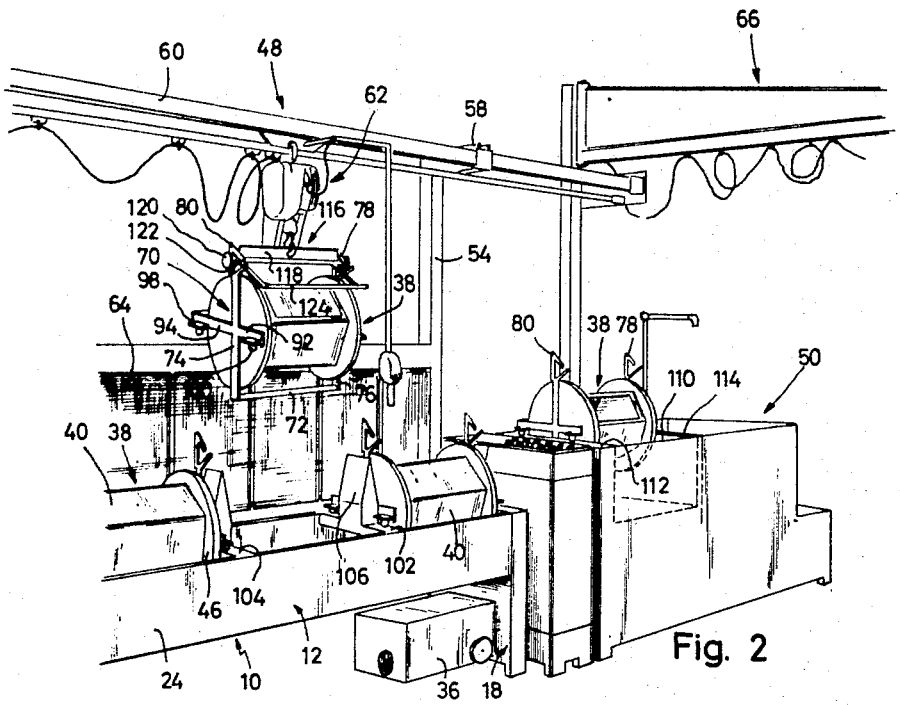
FIG. 2 is a partial perspective view of the apparatus shown in FIG. 1, drawn to a slightly enlarged scale, and showing one of the barrels lifted from the supporting frame and another of the barrels placed in the filling and discharging station at one end of the supporting frame.

Referring now to the drawings, and more specifically to FIGS. 1 and 2 of the same, it will be seen that the tumbling apparatus according to the present invention comprises a supporting frame 10 having a pair of longitudinally extending members 12 and 14 connected to each other by transverse end members 16 and 18. The longitudinal extending members 12 and 14 and the end members are formed by channel irons 20, 22 which are clad by sheet metal plates 24 as best shown in FIG. 5. The supporting frame is also provided with a bottom 26 which forms with the sheet metal members 24, a trough. Two parallel elongated rollers 28 and 30 extending over the whole length of the frame 10 are arranged immediately above the bottom wall 26 of the aforementioned trough, and the rollers 28 and 30 are journaled at opposite ends as indicated at 32 and 34 (FIG. 4) in the end members 16 and 18. The end member 18 of the frame forms a housing to which a drive unit 36 is attached. Transmission means, not shown in the drawing, are provided in the aforementioned housing for transmitting a drive from the drive unit 37 to at least one of the drive rollers. Such transmission means may include gears or a belt or sprocket wheel drive. A plurality of tumbling barrels 38 are arranged within the frame of the apparatus. Each of the tumbling barrels 38 includes a polyhedral prism forming a hollow barrel body 40 which may be closed by a door 42 provided in one of the prism walls and to opposite ends of which circular discs 44 and 46, respectively, are connected coaxially with the axis of the prism. The discs 44 and 46 rest with their peripheral surfaces on the peripheral surfaces of the rollers 28 and 30. When one of the rollers is rotated in one direction about its axis, the barrels resting thereon will obviously be rotated in the opposite direction.

Transporting means 48 are arranged above the frame and the barrels thereon in order to lift the barrels individually out of the frame and to transport the same to a filling and discharge station 50 preferably arranged at one end of the frame. The transporting means 48 comprise two upright columns 52 and 54 fixedly connected to the rear part of the frame 10 and respectively carrying at the upper ends thereof arms 56 and 58 extending forwardly from the upright columns 52 and 54. An elongated guide rail 60 is fixed to the front ends of the arms 56 and 58 so that the guide rail 60 extends substantially along a longitudinal plane of symmetry of the frame 10. The guide rail 60 is longer than the frame 10 and extends especially beyond the frame toward the right, as viewed in FIGS. 1 and 2, over the filling and discharge station 50 located at the right end of the frame. A lifting means, preferably in form of an electrically operated trolley hoist 62 is guided on the rail 60 for movement therealong so that each barrel may be lifted individually from its place in the frame 10 and moved to the filling and discharging station 50 and from there back again onto its place in the frame. A splash wall 64 may be provided between the upright columns 52 and 54 connected to the rear member 14 of the frame. Preferably a boom 66 is also provided at the station 50 and having a trolley hoist 68 for lifting containers filled with material to be tumbled in the barrels 38 for filling the barrels at the station 50.

Figure 5:
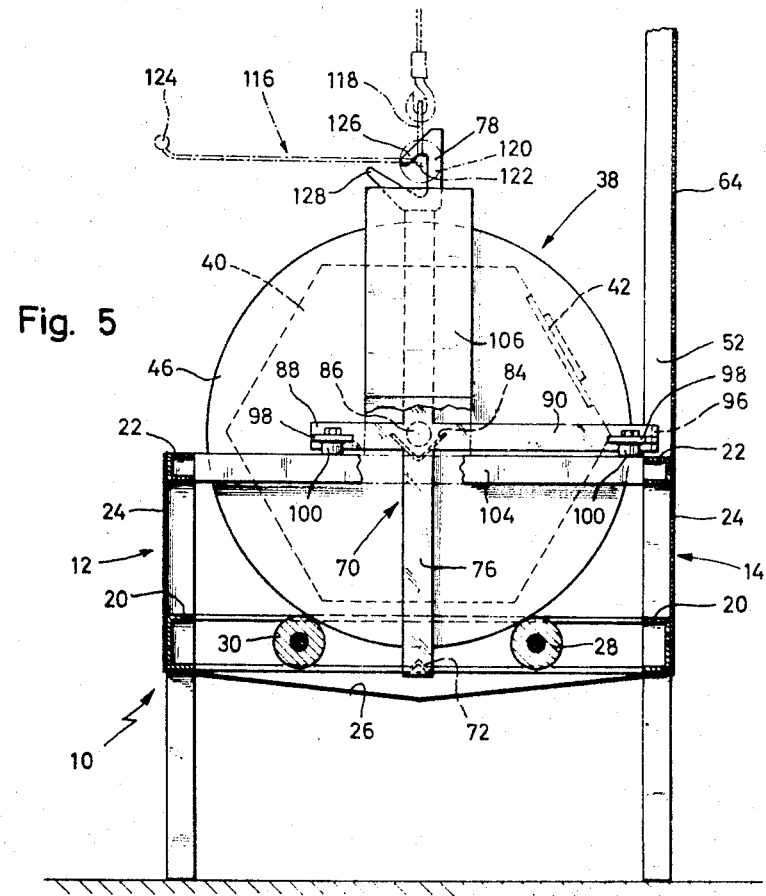
FIG. 5 is a cross section taken along the line 5—5 of FIG. 3 and drawn to an enlarged scale.
Figure 6:
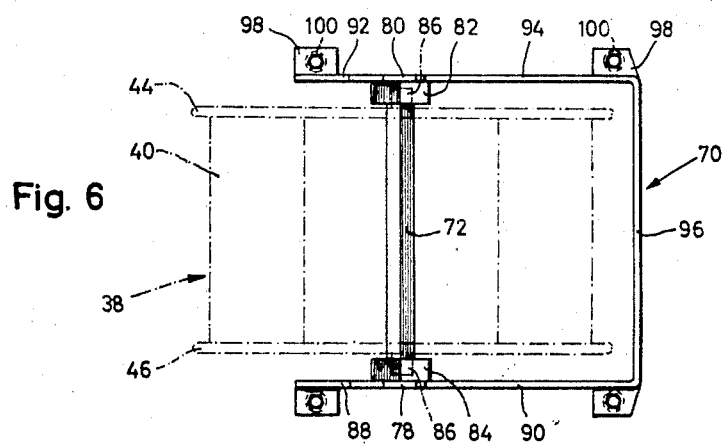
FIG. 6 is a top view of one carrying frame.

To facilitate lifting and seating the barrels in the frame 10, respectively in the station 50, each of the barrels is provided with a carrying frame 70. Each carrying frame 70 includes a U-shaped part formed by two upright arms 74 and 76 connected at the lower ends thereof by a transverse strap 72 and each carrying at its upper free end a hook 78, 80, respectively. As clearly shown in FIG. 5, the transverse strap 72 of the carrying frame extends slightly below the peripheral surfaces of the discs 46 and 48 of the respective barrel. The upright arms 74 and 76 carry intermediate their ends and on the faces thereof respectively facing the outer surface of the adjacent disc a seating means 82, respectively 84 of V-shaped configuration as best shown in FIG. 5. These seating means are adapted to support trunnions 86, respectively projecting from the outer surfaces of the discs 44 and 46 coaxially with the latter, during lifting of the respective frame. Each of the frames 70 preferably comprises further abutment means which may include a pair of transverse arms 88, 90, respectively 92, 94 (FIG. 6) and respectively projecting to opposite sides from the upright arms 76 and 78, and the outer ends of the transverse arms 90 and 94 are integrally connected by a transverse member 96. Each of the transverse arms carries at its outer end a small plate 98, each provided with a downwardly extending buffer 100 preferably formed of elastomeric material, such as rubber. Each of the carrying frames 70 may therefore be seated by means of the transverse arms 88, 90 respectively 92, 94 and the buffers 100 attached thereto on transverse members 102, respectively 104, of the supporting frame 10. The aforementioned components of each frame 70, and especially the seating means 82, 84 and the bottom faces of the buffers 100 are arranged in vertical direction in such a manner so that when the carrying frame is seated on the transverse members of the supporting frame, the circular discs of each tumbling barrel will rest on the drive rollers 28 and 30, while the trunnions 86 which project outwardly from the discs of the barrel will be disengaged from the seating means 84, 86, respectively, as clearly indicated in FIG. 5 so that the barrels 38 may be rotated about their axes, with the trunnions on each barrel out of engagement with the seating portion of the carrying frame.

Figure 3:
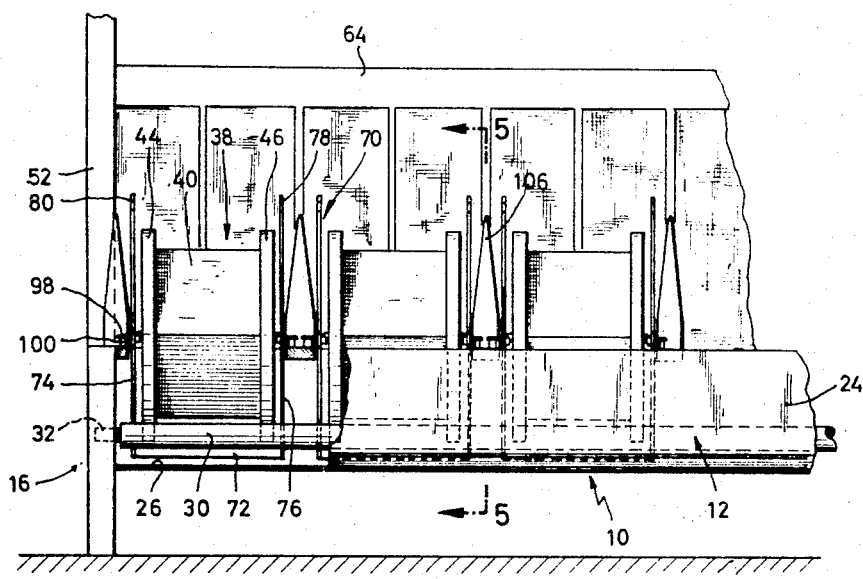
FIG. 3 is a partial front view of the apparatus shown in FIG. 1 with part of the supporting frame broken away to show more clearly the interior thereof.
Figure 4:
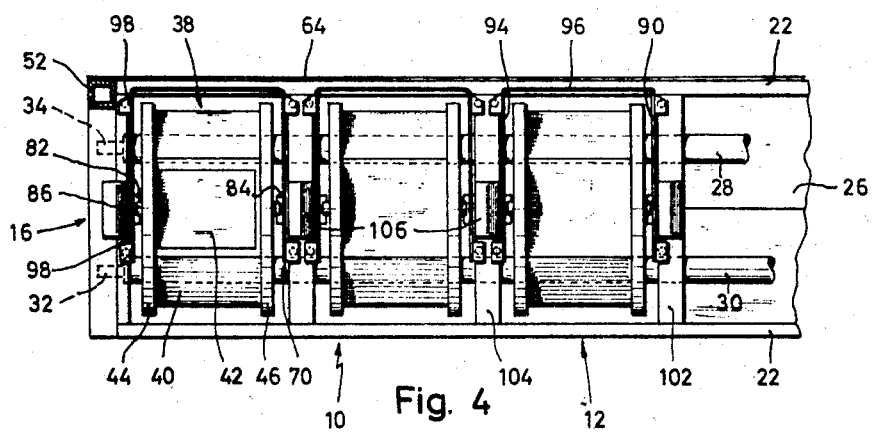
FIG. 4 is a partial top view of the apparatus.

As shown in FIGS. 3 and 4, each of the transverse members 102 and 104 of the carrying frame 10 serves to seat thereon the abutment means of adjacently arranged tumbling barrels 38. Each of the transverse members 102 and 104 of the carrying frame 10 is intermediate its ends provided with an upwardly projecting guide means 106, each having a pair of oppositely directed guide faces approaching each other in upward direction so that the guide faces on each guide means 106 may cooperate with ends of adjacent barrels to properly orient the barrels on the supporting frame 10, especially during lowering of the barrels. As shown in FIG. 2, the station 50 is provided with a large cavity 110 having a pair of side wall portions 112 and 114 adapted to receive at the upper surfaces thereof the abutment means of a carrying frame when the latter with the barrel carried thereby is placed on the station 50 as shown in FIG. 2.

The lifting means 62 are preferably provided with engaging means 116 adapted to engage in the hooks 78 and 80 of each carrying frame. The engaging means 116 may comprise a support member 118, from which a pair of supporting bolts 122 respectively project to opposite sides for engagement with the hooks of a carrying frame and each provided at its free end with a limiting member 120 of larger cross section than the bolts. The engaging means 116 has further a handle 124 facilitating operation of the engaging means and hooking of the supporting bolts 122 into the hooks of the respective carrying frame. To facilitate hooking of the supporting bolts 122 into the hooks of the carrying frame, each of the hooks 78 and 80 includes a guide member 128 arranged at the open side of the respective hook and projecting upwardly and inclined away from the lower end thereof beyond the hook end portion 126 so that during hooking of the supporting bolts 122 into the corresponding hooks, the bolts may slide on the upper surface of the guide members 128 to facilitate their engagement with the hooks.

It will be understood that each of the elements described above, or two or more together, may also find a useful application in other types of tumbling apparatus differing from the types described above.

While the invention has been illustrated and described as embodied in a tumbling apparatus with a plurality of barrels arranged substantially axially aligned with each other, and transporting means arranged above the barrels substantially in a vertical plane of symmetry extending through the barrel axes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Tumbling apparatus, especially for cleaning and polishing of articles, comprising, in combination, an elongated supporting frame; a pair of elongated drive rollers mounted in said frame rotatable about spaced substantially parallel and substantially horizontally arranged axes; drive means connected to at least one of said pair of drive rollers for rotating the same about its axis; at least two tumbling barrels having each at opposite ends thereof circular discs and a closable door for filling and emptying the barrel, said barrels being arranged coaxially with and adjacent each other with said circular discs resting on said rollers; a filling and discharge station in the region of one end of said supporting frame; and transporting means arranged above said supporting frame and including substantially horizontally arranged guide rail means extending in longitudinal direction of said frame beyond said one end thereof, and lifting means movable along said guide means and adapted to cooperate with each of said tumbling barrels for lifting the same individually from said rollers and transporting the same to said filling and discharge station and back onto the rollers.

2. A tumbling apparatus as defined in claim 1, wherein each of said barrels has a pair of trunnions respectively projecting outwardly from said discs coaxially therewith, and including frame for each barrel connectable to said lifting means and having a pair of seating means adapted to seat said trunnions during lifting of said carrying frame by said lifting means.

3. A tumbling apparatus as defined in claim 2, wherein said carrying frame comprises a pair of upright arms respectively arranged adjacent the discs of the respective barrel and wherein said seating means project from said arms toward the respective disc.

4. A tumbling apparatus as defined in claim 3, wherein said elongated supporting frame has a plurality of spaced members extending transverse to the elongation of the supporting frame, between which said tumbling barrels are respectively located and each of the carrying frames additionally including a strap connecting said upright arms on one of the ends thereof to each other, and abutment means on said arms adapted to be seated on said transverse members of said supporting frame during lowering of the carrying frame, said abutment means and said seating means being arranged in vertical direction with respect to the axes of said trunnions and the axes of said drive rollers in such a manner that during seating of said abutment means on said transverse members of said supporting frame, the discs of the respective barrel will rest on said drive rollers while said seating means will be disengaged from said trunnions.

5. A tumbling apparatus as defined in claim 4, wherein said abutment means comprise a pair of substantially horizontal transverse arms respectively projecting to opposite sides of each upright arm of the carrying frame and respectively extending spaced from and substantially parallel to the discs of the respective barrel, and each of said transverse arms carrying at the region of its free end a downwardly extending elastically yieldable buffer.

6. A tumbling apparatus as defined in claim 5, wherein said carrying frame includes a member connecting the free end of the transverse arms projecting to one side of one upright arm to the free end of the corresponding transverse arm on the other upright arm, said connecting member being outwardly spaced from the periphery of the discs of the respective barrel.

7. A tumbling apparatus as defined in claim 4, wherein said strap connects the lower ends of said upright arms to each other and including a hook connected to the upper free end of each upright arm, and including engaging means carried by said lifting means and adapted to engage in said hooks.

8. A tumbling apparatus as defined in claim 7, and including a guide member arranged at the open side of each hook and projecting upwardly inclined away from the lower end of the respective hook so that said engaging means may slide along the upper surface of said guide member into said hooks.

9. A tumbling apparatus as defined in claim 7, wherein said engaging means comprise a support member, a pair of supporting bolts respectively projecting from opposite ends of said support member and respectively engageable into said hooks, and each carrying at its free end a limiting member of larger cross section than said bolt, and a handle connected to said support member.

10. A tumbling apparatus as defined in claim 4, and including a plurality of upwardly projecting guide means respectively arranged on said transverse members of said supporting frame, and the guide means arranged at opposite ends of each barrel have guide faces approaching each other in downward direction for orienting each of the barrels with respect to the transverse members of the frame during lowering of the barrels into the frame.

11. A tumbling apparatus as defined in claim 10, wherein each of said guide means has a pair of guide faces approaching each other in upward direction so that the guide faces on each guide means may cooperate with ends of adjacent barrels.

References Cited

UNITED STATES PATENTS

| | | | |
|---|---|---|---|
| 2,006,451 | 5/1935 | Glidden | 259—89 |
| 2,036,261 | 4/1936 | Dinley | 134—76 X |
| 2,603,005 | 7/1952 | Ford | 259—90 X |
| 3,143,975 | 8/1964 | Abbey | 134—76 |

ROBERT W. JENKINS, *Primary Examiner.*

U.S. Cl. X.R.

259—57; 134—76